May 5, 1959 P. F. MOONAN 2,884,960
IMPROVED HARNESS CORD TIE-UP FOR JACQUARDS
Filed Oct. 19, 1956 5 Sheets-Sheet 1
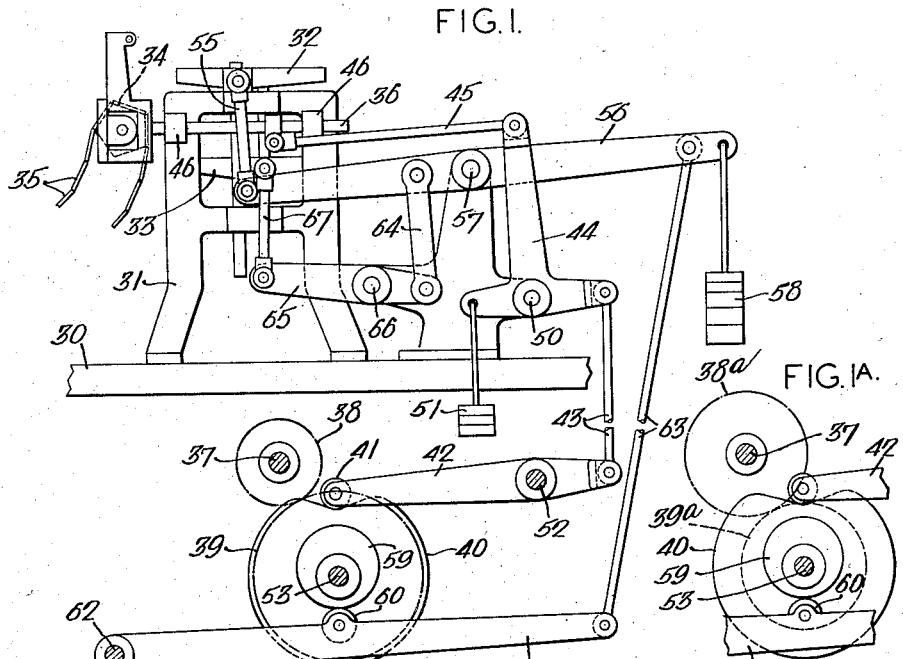
FIG.1.
FIG.1A.
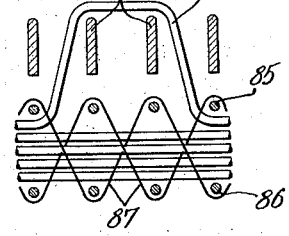
FIG.2.
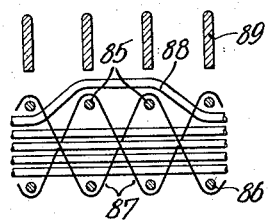
FIG.3.
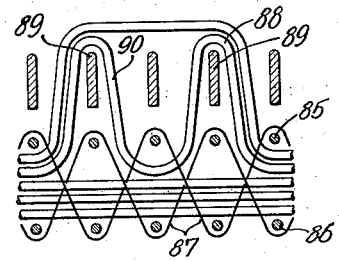
FIG.4.
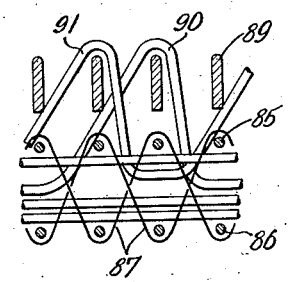
FIG.5.
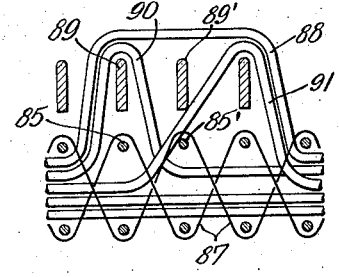
FIG.6.
INVENTOR:
PHILIP F. MOONAN
BY
ATTY.

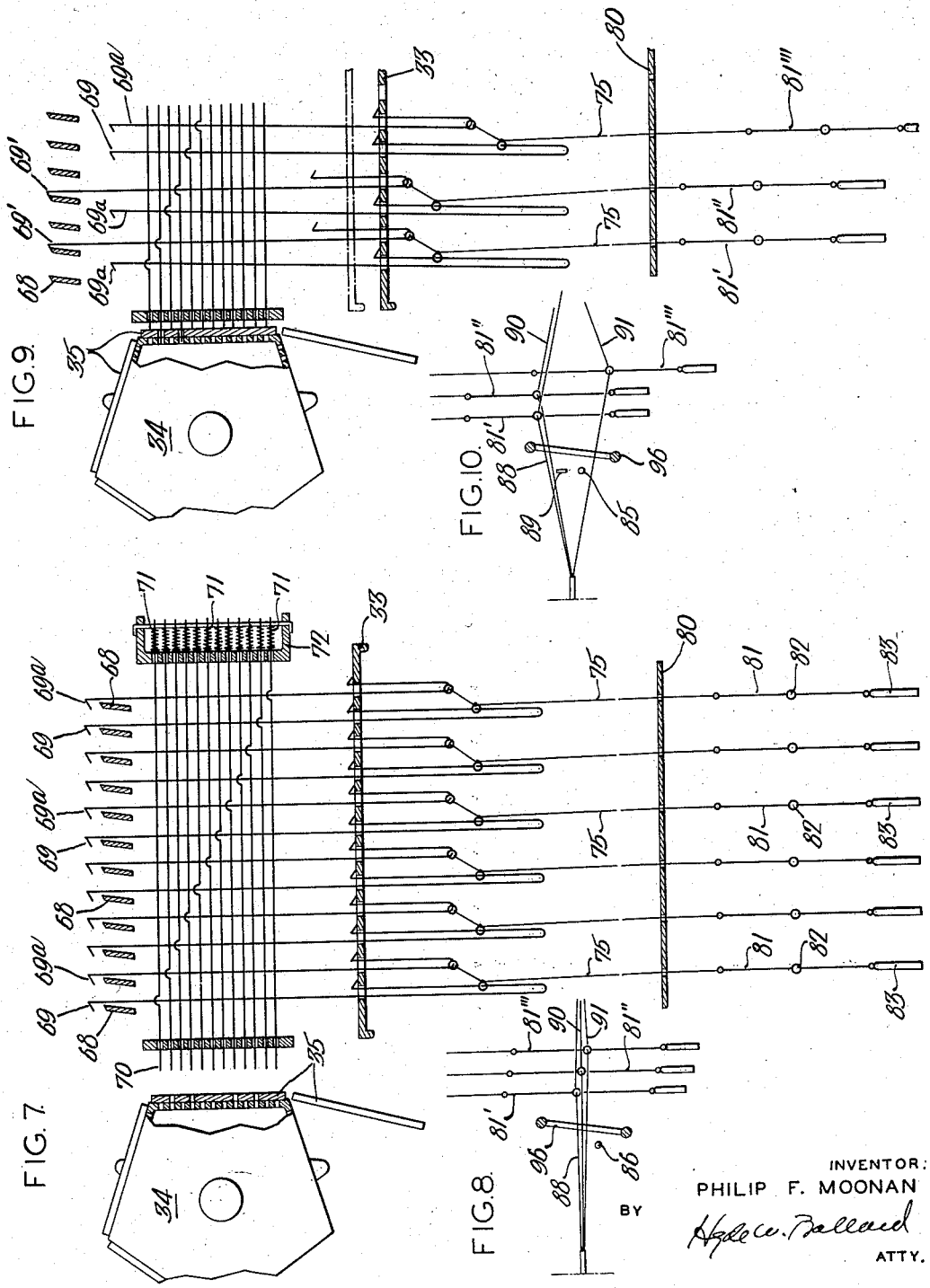

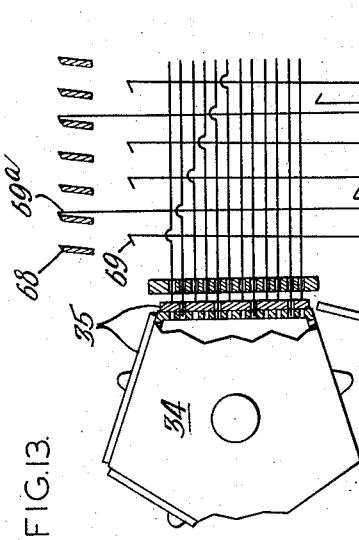
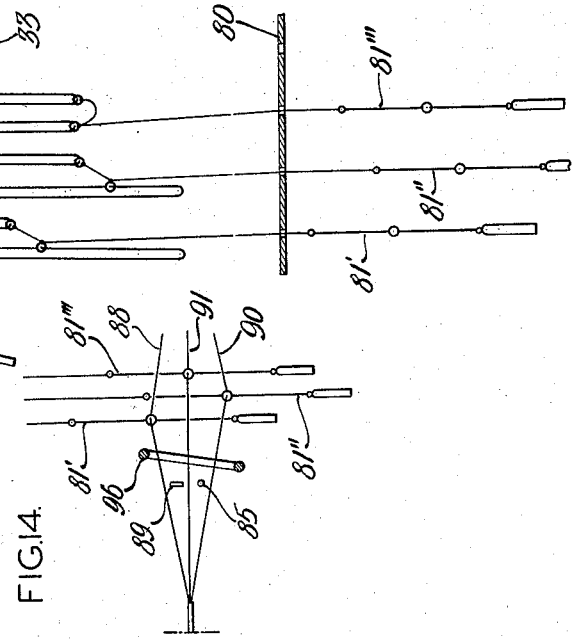
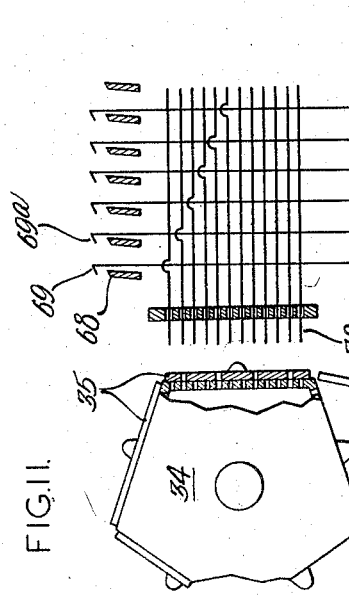
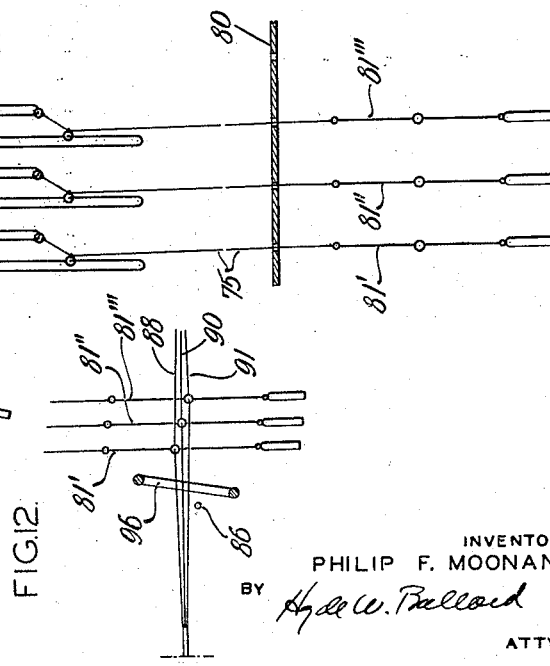

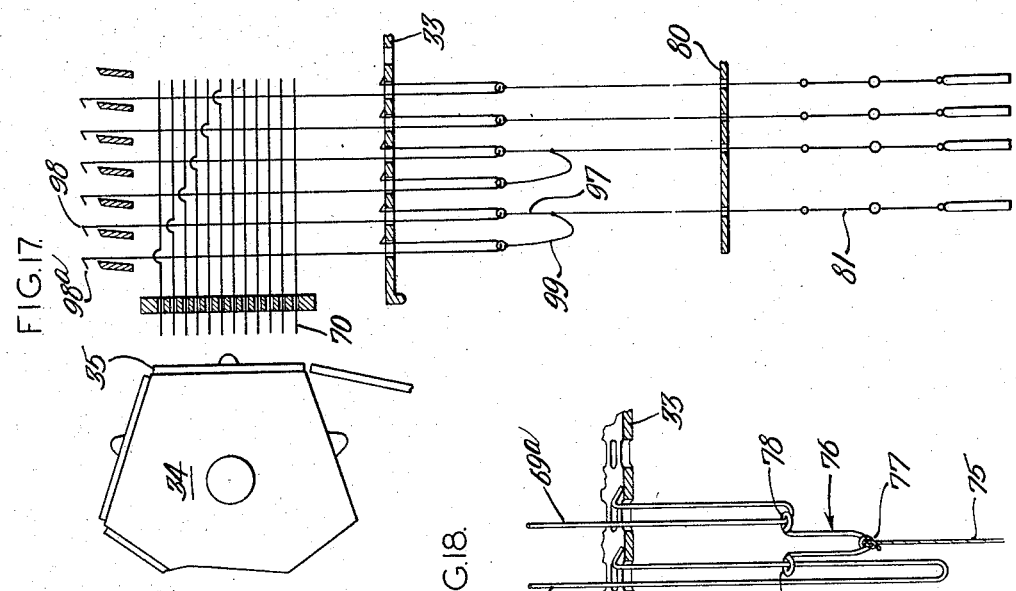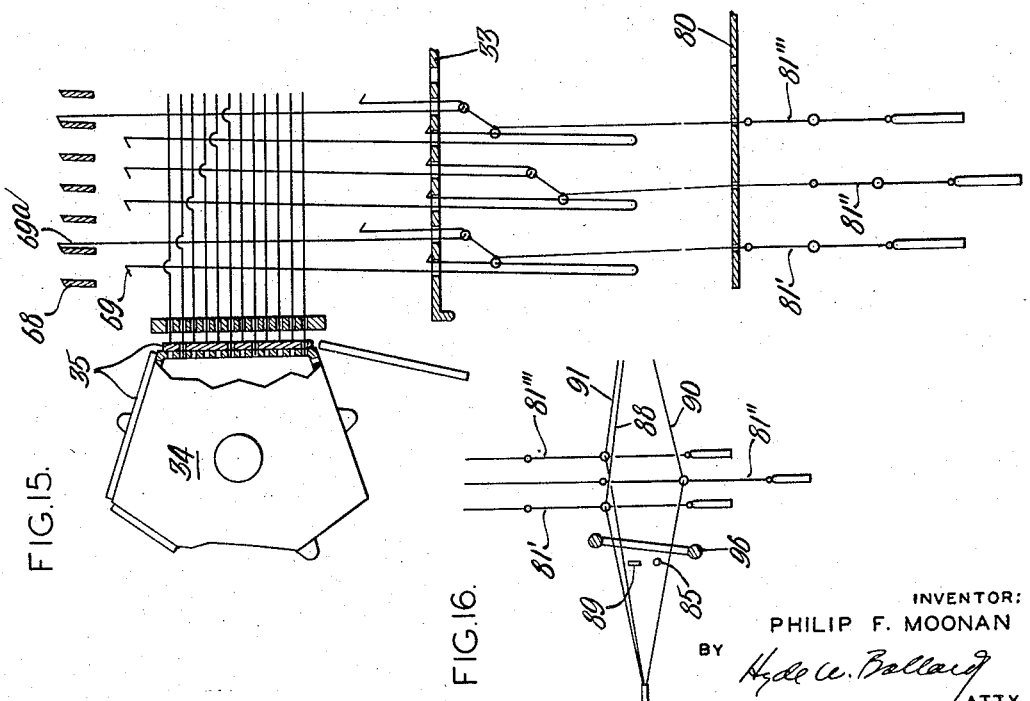

May 5, 1959  P. F. MOONAN  2,884,960
IMPROVED HARNESS CORD TIE-UP FOR JACQUARDS
Filed Oct. 19, 1956  5 Sheets-Sheet 5
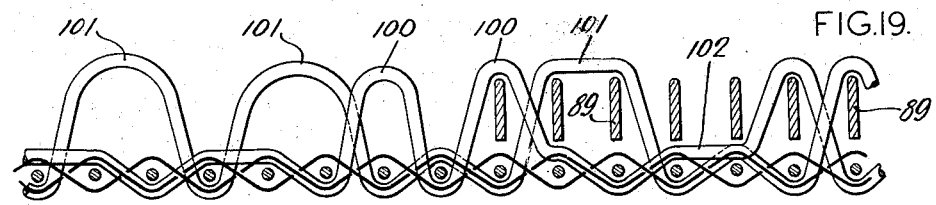
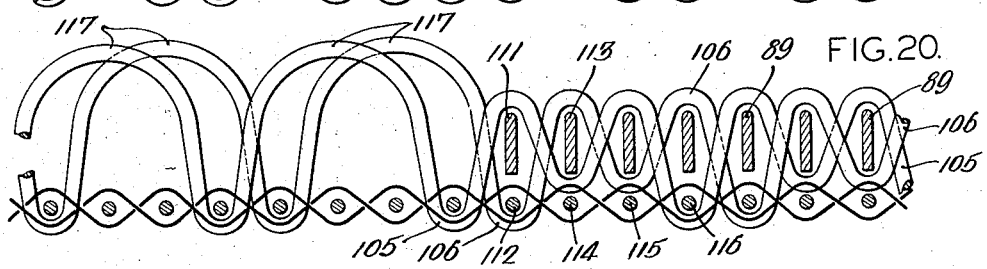
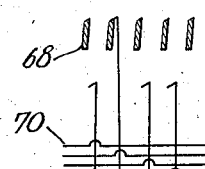
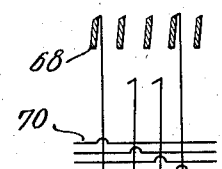
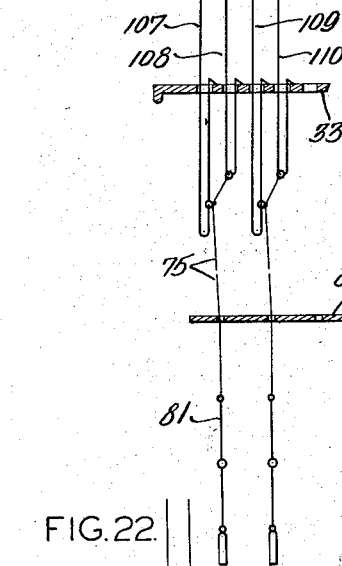
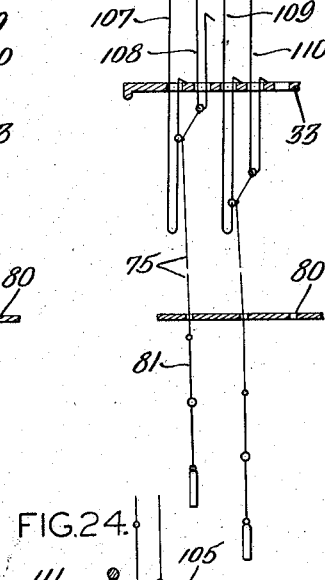
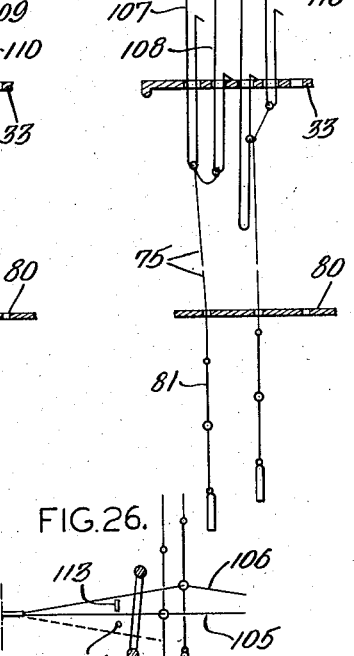
INVENTOR:
PHILIP F. MOONAN
BY
ATTY.

United States Patent Office 2,884,960
Patented May 5, 1959

2,884,960

IMPROVED HARNESS CORD TIE-UP FOR JACQUARDS

Philip F. Moonan, Philadelphia, Pa., assignor to James Lees and Sons Company, Bridgeport, Pa., a corporation of Pennsylvania Application October 19, 1956, Serial No. 616,968

8 Claims. (Cl. 139—59)

This invention pertains to the weaving of pile fabrics and more particularly to improved means for providing various types of floats in an upholstery or carpet material woven on a jacquard loom.

The current vogue for carved or sculptured effects in floor coverings has revived the interest in mechanisms and methods whereby warp pile ends can be carried indefinitely as high floats or low floats or intermediate floats.

For the purposes of the present description, the term "float" is used to designate any condition in which a warp pile yarn is not bound down under the normal binding weft shot. This binding weft shot may be either a top shot or a bottom shot in a multi-plane fabric or an adjacent shot in a single plane fabric. High floats are characterized by the fact that a warp pile end is carried over two or more successive pile wires without being bound down in between. An intermediate float is characterized by a pile warp yarn which is carried over a pile wire together with its accompanying shot and then over a subsequent or preceding shot but under the accompanying pile wire for said subsequent or preceding shot. Low floats are characterized by a warp yarn which is carried over at least one top shot and under the associated wire for said top shot.

In general, the present invention may be utilized with weaves in which the pile wire is inserted with or directly over a top shot in which case the weave is called "wire on shot." Similarly, by varying the timing of the loom and jacquard mechanism, the wire may be positioned between shots so that the weave is called "wire between shot." The pile wires may be of any type known in the art, such as round non-cutting wires, high and low wires, cutting wires, and serrated wires. The manner in which such wires are employed and controlled in a pile wire loom is well known and need not be elaborated upon here.

A primary object of the invention is to provide an improved jacquard and associated mechanism which enables the individual pile warps to be positioned selectively in any one of at least three positions when the top shot and wire are inserted into the shed. In the case of a single plane fabric, it will be understood that the bottom shots are omitted so that the term "top shot" is intended to include the shot associated with a wire insertion regardless of whether bottom shots are employed or not.

A further object of the invention is to provide an improved control attachment between the harness cords and the hooks of a jacquard mechanism.

A still further object is to provide a simplified jacquard which is capable of weaving at least three types of floats without the necessity for utilizing stationary knives or modifications in the conventional jacquard attachment.

A still further object of the invention is to provide a method of weaving pile fabrics having floats.

Further objects will be apparent from the drawings and specification in which:

Fig. 1 is an end view of jacquard and parts of its associated loom construction in accordance with the present invention, Fig. 1A is a detail showing the change in gearing for one-shot operation, Figs. 2–6 are diagrammatic weave diagrams of typical float constructions capable of being produced in accordance with the present invention, Fig. 7 is a diagrammatic arrangement of parts of the jacquard mechanism and the harness cord hook-up of the present invention, Fig. 8 is a diagrammatic view of the heddles and the position of the warp pile ends corresponding to Fig. 7, Fig. 9 is a diagrammatic view of the apparatus of Fig. 7 showing the position of the parts at the next portion of the cycle, Fig. 10 is a view of the apparatus of Fig. 8 but corresponding to the positions shown in Fig. 9, Figs. 11–16 are similar views but showing the positions of the mechanism during subsequent portions of the cycle, Fig. 17 is a view similar to Fig. 7 employing a modified tie-up for the harness cords, Fig. 18 is an enlarged fragmentary perspective showing the manner in which the harness cords are tied up, Figs. 19 and 20 are weave diagrams illustrating a warp-wise section of a single plane one-shot fabric woven in accordance with the present invention, Fig. 21 is a diagrammatic view of the jacquard and harness tie-up used for the weaves of Figs. 19 and 20, Fig. 22 is a schematic diagram of the heddle positions corresponding to Fig. 21, and Figs. 23–26 are views showing subsequent positions of the mechanism during this cycle of weaving.

The invention comprises essentially the provision of a taut and loose tie-up for each harness cord. In the preferred form, this is accomplished by connecting the upper extremity of each harness cord to two jacquard hooks; but instead of these hooks being identical as in conventional practice, one hook of each pair is provided with a substantially longer bottom extremity than the other hook of the pair so that there is a selectively different length connection extending between the knives of the jacquard and each lingo heddle. A sliding connection between the bottom of each hook and its associated neck cord permits the long bottom or the short bottom hook to be selected without interfering with the raising of the connected heddle. In the normal at-rest position all of the hooks are suported on the grate by means of the usual reverse bend which is at a spaced distance from the extreme bottom terminus of the hooks. When the long bottom hook is selected, the harness cord is free to move up and down on the short bottom hook so that if the short bottom hook is raised, the pile warp controlled by this harness cord and lingo will be carried to a top shed position. If the long bottom hook is selected or raised, then the harness and its associated pile warp will be carried only to a middle or center position; whereas if both hooks are rejected, the particular pile end controlled thereby remains in its initial lowermost position. It will be understood that when the jacquard card calls for a heddle to be raised by one of the shorter connections, this provides relatively quick or instant action for the heddle in question and when the longer harness cord is selected, the action of the associated heddle is delayed or slow-acting with respect thereto.

The same result may be achieved by using hooks of equal bottom lengths but a taut and slack tie-up for each harness cord. The jacquard actuating mechanism is controlled in such a manner that it may be readily converted from two-shot operation in which the grate is simultaneously actuated to one-shot operation in which the grate may remain stationary.

Referring now more particularly to the drawings, Fig.

1 shows diagrammatically the conventional jacquard mechanism supported on the upper part 30 of a loom. The side members 31 of the jacquard carry the movable griff 32 and grate 33. A reciprocating cylinder 34, over which the jacquard cards 35 are carried, is actuated by a cylinder push rod 36, controlled by the main loom crank shaft 37 through meshing gears 38, 39, cam 40, cam follower 41, rocker arm 42, link 43, pile crank 44, and link 45. The cylinder push rod 36 is horizontally slidable in bosses 46 to reciprocate the cylinder 34 and simultaneously present a new card 35 to the needles by means of a ratchet mechanism all in accordance with conventional practice. Bell crank 44 is journaled on shaft 50 and provided with a counterweight 51. Rocker arm 42 is journaled on shaft 52 and cam 40 is keyed to camshaft 53.

Griff 32 is oscillated in a vertical direction by means of a pair of griff lifting rods, sometimes called pump rods, one of which is shown at 55. The lower ends of these rods are connected to a walking beam 56 journaled at 57 and provided with a counterweight 58. The opposite end of walking beam 56 is actuated from camshaft 53 through an eccentric 59, cam follower 60, rocker arm 61, journaled at 62, and connecting link 63. In the position of Fig. 1, it will be observed that the cam follower 41 is at the dwell of cam 40 so that cylinder 34 is retracted or moved away from the jacquard structure. Griff 32, however, is at its lowermost position since the minimum radius of eccentric 59 is in contact with cam follower 60. Grate 33 is in its raised position since the grate is actuated from walking beam 56 through link 64, rocker arm 65, journaled at 66, and link 67. The connection of this mechanism as shown in Fig. 1 is such that when the left-hand end of walking beam 56 is lowered, the left-hand end of rocker arm 65 and subsequently the grate 33 are raised.

Referring now to Figs. 7–16, the griff 32 carries a plurality of knives 68, 68 which are positioned to engage the jacquard hooks 69, 69. These hooks are in turn actuated by a plurality of needles 70, 70 under control of compression springs 71, 71, supported in the jacquard frame member 72. In accordance with standard jacquard practice, the cards 35 may be selectively punched or left blank at positions in alignment with the outer ends of needles 70, 70 when the cylinder 34 moves to present one of the jacquard cards in contact with the ends of the needles. If the card is punched, the needle is not displaced, so that the jacquard hooks under control of the needles remain in the position shown in Fig. 7. Such a hook is referred to as a selected hook. If the card or cards 35 are not punched, the needle striking such blank areas on the card is displaced against the pressure of springs 71, 71 so that the hooks 69, 69 controlled by such displaced needles are moved out of the path of the knives 68, 68 when the griff is raised. The above description of the operation of a jacquard is well known in the art and is believed to be ample to illustrate the operation of the present apparatus.

Particular attention is directed to the formation of the bottoms of the hooks 69 and 69a. Customarily, the bottom of the jacquard hooks carries a reverse bend forming a loop with the bottom terminus of the hook upset or bent so that the hook in a lowered position is supported by the grate 33 (Fig. 18). I provide pairs of hooks 69 and 69a in which the lower extremities of these bends are at different elevated positions. Hooks 69, 69 are substantially longer than 69a, 69a. Since each harness cord 75 is connected to two hooks, I provide a U shaped element 76 (Fig. 18) to which the harness cord is tied at 77. The member 76 is substantially U shaped and the upper part of each leg is formed into an annular eye 78 and 79 so that the eye 78 slides or rests in the bend of one of the hooks 69a and the eye 79 is slidably connected to the bottom of a long hook 69. The harness cords pass through an eye board 80 and are attached to the lingo heddles 81, 81 having eyes 82, 82 and individual weights 83, 83. When the card cutter punches the jacquard cards in such a manner that a short hook 69a is selected, this hook raises the harness cord and the lingo heddles to a top or maximum high position. Such a position is shown in Fig. 9. On the other hand, when the cards are cut so that the hook 69a of a pair is rejected but a hook 69 of such pair is selected, then the lingo heddle is raised to an intermediate or middle position through its harness cord as shown in Fig. 13. In the event both hooks of a pair are rejected, they remain supported on the grate 33 and are carried to the bottom position as shown in Fig. 9.

It will thus be understood that the card cutter, by suitable manipulation of the card punching apparatus, can control the relative position of any pile warp and so that it may be in a top, middle, or bottom position in the shed at the time the top shot and the pile wire are inserted. Figs. 2–5 are typical of weave diagrams that may be provided in accordance with the designer's choice. All of these diagrams show a five frame Wilton type of fabric in what is termed "a two-shot wire on shot construction." The stuffer warps have been omitted in the interest of clarity, but it will be understood that the same result can be achieved with any number of pile warps and in any desired type of fabric loom which is controlled by a jacquard.

In Fig. 2 four of the frames are running dead between the top shots 85, 85 and the bottom shots 86, 86 which are bound together by means of the usual double chain warps 87, 87. Warp yarn 88, however, has been raised to provide a high float over two successive pile wires 89, 89. In Fig. 3 four frames are also running dead, whereas frame 88 is carried over two adjacent top shots 85, 85 and under their associated wires 89, 89 to form a low float. In Fig. 4 warp yarn 88 is carried over three successive pile wires 89 and warp yarn 90 is carried over alternating wires and under an intermediate top shot. Since there is no normal binding point missed by warp yarn 90, there are no floats in this warp shown in Fig. 4, so that a conventional binding may be combined with any one or more types of float weaves. In Fig. 5 a construction is shown in which three frames are running dead, whereas pile warps 90 and 91 are controlled to provide staggered intermediate floats over adjacent pile wires and adjoining top shots. In Fig. 6 warp yarn 88 is carried over three successive pile wires to form a high float. Warp yarn 90 works over a single pile wire 89 and its associated shot 85, whereupon it is returned as a dead frame to run in the ground fabric. Warp yarn 91 is carried between a pile wire 89′ and its associated top shot 85′ and thence over a subsequent wire 89 to form an intermediate float. The cycle of jacquard operation employed to provide the diagram of Fig. 6 will be described more fully in conjunction with Figs. 7–16 and will be found to be typical of the operation of the invention.

In Fig. 7 and in Fig. 8 the parts of the jacquard are illustrated diagrammatically at the time when the bottom shot 86 is inserted below all the pile warps, the stuffer warps (not shown) and one of the chain warps. At this point in the cycle of operation, the cylinder 34 is retracted to permit rotation, thus presenting a new card 35 to the ends of needles 70, 70. As soon as the bottom shot 86 is inserted, reed 96 beats the shot up into the fell. Cylinder 34 is moved by rotation of cam 40 to the position shown in Fig. 9. This in turn causes certain needles 70 to be selected or rejected in accordance with the manner in which the jacquard cards 35, 35 have been punched. In the illustrative example of Fig. 9, two short hooks 69a, 69a have been selected by means of appropriate holes punched in the card. Since both of these are short hooks, the pile warp ends 88 and 90, which pass through heddles 81′ and 81″ respectively, are raised to the top shed position as shown in Fig. 10. Hooks 69 and 69a controlling heddle 81‴ have both been rejected, so that warp yarn 91, which is controlled thereby, is carried to the bottom position of the shed when the grate 33 drops. At this point the proper pile wire 89 and its associated top shot 85 are inserted in front of the reed 96 as illustrated in Fig. 10. The corresponding position of the two previously described shots and the wire can be seen clearly in the left hand portion of Fig. 6 in which pile yarns 88 and 90 are over the wire and pile yarn 91 is under the wire and the top shot. The next portion of the cycle is illustrated in Fig. 11 which is a duplication of Fig. 7 but shows the return to initial position of the griff and the grate and the insertion of the next subsequent bottom shot. However, in this case the cylinder 34 has made one-fifth of a revolution to present the following jacquard card 35 to the needle ends.

When the following card of Fig. 11 is pressed against the needle ends a different selection is made as shown in Figs. 13 and 14. In this case we now have yarn 88 raised again to the top position because its associated short hook 69 was selected. However, both hooks for yarn 90 were rejected in this case so that this yarn is now dropped to the bottom position of the shed whereas the long hook 69a controlling heddle 81‴ was selected to carry pile yarn 91 to a mid-position as shown in Fig. 14. After the insertion of the next wire 89 and the top shot 85 of Fig. 14, the relative positions of the pile warps may be seen clearly in Fig. 6 by noting the pile yarns above and below the third pile wire from the left. It will there be seen that pile yarn 88 is over both the wire and the shot, yarn 91 is between the top shot 85′ and wire 89′, whereas yarn 90 is below both the wire and the shot. After the cam 40 and eccentric 59 have turned another 180°, the bottom shot is inserted as shown in Figs. 7 and 11 and beaten up by the reed. Figs. 15 and 16 illustrate the next selection of the jacquard which is achieved by turning the cylinder 34 another fifth of a turn. In this case, the short hook 69 for yarn 88 is again selected, both hooks for yarn 90 are rejected, and the short hook 69 for yarn 91 is selected. The resultant weave after the beat-up of the reed against the wire and the top shot is shown at the right of Fig. 6 in which yarn 88 is again carried over the last wire 89 to form a long high float over three wires, yarn 91 is carried over this wire to complete the intermediate float, and yarn 90 is permitted to run dead in the ground. It will be understood that if the card for this last selection had been punched so that the long hook for yarn 91 had again been selected as shown in Fig. 13, then yarn 91 would have been carried underneath the wire and over the top shot to provide a low float of the type illustrated in Fig. 3.

In the previously described mechanism the harness cords 81, 81 have been connected to different length hooks of a pair by means of the sliding connection 76. However, the same result may be achieved by using all hooks of the same length but a tight and slack harness cord as shown in Fig. 17. In this case the heddles 81 are supported at their upper ends through the taut connection 97 to one of a pair of identical hooks 98. The other hook of the pair is connected to the same harness cord by means of a normally slack connection 99, so that if hook 98 is selected, the heddle 81 is raised to the high position whereas if hook 98a is selected, the heddle will be raised only to an intermediate position because substantial hook travel is permitted before the slack in connection 99 takes up. It will be apparent from an understanding in comparison of the operation of the invention as described above in connection with the short hooks, long hooks, and slack and taut tie-up of the harness cords that any actuating element connected between a single heddle and a pair of hooks which provides two position actuation of the heddle in accordance with which hook is selected is within the scope of the invention.

The above described operation of the jacquard using a movable grate is employed for the two-shot construction shown in Figs. 2–5. Where it is desired to weave one-shot construction such as illustrated in Figs. 19 and 20, the grate 33 remains stationary. For this purpose link 64 is disconnected so that operation of walking beam 56 does not affect the rocker arm 65. In this event the crankshaft gear 38 should be replaced by gear 38a (Fig. 1A) which is twice the diameter to give a 1 to 1 ratio between the crankshaft and the cam shaft instead of the 2 to 1 ratio shown in Fig. 1. In other respects, the operation of the jacquard is substantially the same and the type of weave and particularly the nature of a float is controlled entirely by the manner in which the jacquard cards are punched. Illustrative weave diagrams are shown in Figs. 19 and 20 in which an intermediate float is provided at 100, a high float at 101, and a low float at 102. The right hand portion of Figs. 19 and 20 shows the formation of the fabric before the pile wires 89 are withdrawn and the left hand portions of the diagrams show the general shape of the pile loops after the wires are withdrawn. In Fig. 20 there is illustrated a staggered high float weave which is desirably formed by working one pile warp yarn over, under, and over three adjacent pile wires before tying into the ground. The same sequence is provided for a staggered warp preferably in the same dent.

To illustrate specifically how the weave of Fig. 20 is formed, reference is made to Figs. 21–26. In Fig. 21 the grate 33 remains in the bottom position since link 64 has been disconnected. Both warps 105 and 106 are therefore in the bottom position as shown in Fig. 22 because the knives 68, 68 are down and hooks 107, 108, 109, and 110 are all resting on grate 33. This is the position of the hooks when a new jacquard card is brought in for indexing. After indexing the griff is raised to carry selected hooks to the top position on knives 68, 68. In Fig. 23 hooks 107, 109, and 110 have been rejected so that short hook 108 is carried up by the knife to position warp yarn 105 at the top of the shed over wire 111 and shot 112. Warp 106, however, is in the bottom of the shed and therefore underneath the wire and shot. On the next selection which follows a lowering of all the hooks similar to Fig. 21, the cards are now cut so that hooks 107 and 110 are selected whereas hooks 108 and 109 are rejected. The selection of hook 107 which is the long hook for warp 105 now carries it only to a mid-position between subsequent wire 113 and its associated shot 114. The selection of hook 110, however, which is the short hook for yarn 106 carries this yarn to the top position over wire 113. In the next selection the relative positions of yarns 105 and 106 are reversed so that yarn 105 is over the wire and yarn 106 under the wire (Fig. 20). In the fourth selection, however, yarn 106 is over the wire but yarn 105 is carried to the bottom position to tie it under shot 115. Yarn 106 is carried down to be tied under the next subsequent shot 116. When the wires are withdrawn, high long floats 117, 117 are formed in which each pile yarn is tied down under every fourth shot and they are individually tied down under adjacent shots to form a weftwise staggered relationship.

It will thus be understood that I have provided an improved arrangement for weaving sculptured effects in pile fabrics which requires very little modification of the conventional jacquard mechanism. In fact, if the taut and slack tie-up is used, it is not even necessary to replace the conventional jacquard hooks. The operation is extremely simple and the card cutter is provided complete control of each pile yarn for every indexing. In this way sculptured and patterned effects having high, low, or intermediate floats of any length are obtained at the will of the designer and card cutter. Having thus described my invention,

I claim:

1. In a pile fabric loom jacquard having a griff, a grate, an oscillating cylinder, a series of cards sequentially movable on said cylinder, a plurality of needles selectively actuated by said cards, a plurality of hooks actuated by said needles to be selectively engaged by the griff in a manner controlled by the cards, the improvement comprising a relatively taut connection between one of said hooks and a heddle in the loom, and a relatively slack connection between another of said hooks and the same heddle whereby when the griff is raised to a predetermined height, the heddle is selectively positioned at a high or intermediate point in the shed in accordance with which of the hooks is selected.

2. In a pile fabric loom lacquard, a plurality of hooks means for raising a selected group of said hooks to a predetermined elevation, a quick acting connecting element between one of two separate hooks and a single heddle and a relatively slow acting connecting element between the other of said hooks and said heddle.

3. A jacquard for pile fabric looms comprising a frame, a griff vertically reciprocable in said frame, a plurality of knives carried by said griff, means for reciprocating the griff and knives, a grate reciprocable in said frame, disconnectable means for selectively reciprocating the grate in timed relation to the griff, a plurality of hooks supported on said grate and positioned to be selectively engaged by the knives, a taut connection from one hook to a heddle in the loom, and a slack connection from another hook to the same heddle when all said hooks are resting on the grate.

4. In jacquard controlled shed forming apparatus for weaving textile fabrics, the combination which comprises a plurality of heddles through which warp yarns are passed, a plurality of movable hooks supported in a jacquard mechanism, means for elevating a selected plurality of said hooks from a first fixed position to a predetermined fixed elevated position, and a slack connection between a plurality of heddles and a group of said hooks when the hooks are in a lowered position whereby selected heddles are raised to a predetermined intermediate position when the elevating means carries all selected hooks to its said predetermined fixed elevated position.

5. In jacquard controlled shed forming apparatus for weaving textile fabrics, the combination which comprises a plurality of heddles through which warp yarns are passed, a plurality of movable hooks supported in a jacquard mechanism, means for elevating a selected plurality of said hooks from a first fixed position to a predetermined fixed elevated position, a taut connection between a plurality of heddles and a first group of said hooks when the hooks are in a lowered position, and a slack connection between a plurality of heddles and a second group of hooks when the hooks are in a lowered position whereby heddles selected through the taut connection are raised to a predetermined high position and other heddles selected between slack connection are raised to a predetermined intermediate position when the elevating means for the hooks is raised to its said predetermined fixed elevated position.

6. In a pile fabric loom jacquard, a plurality of pairs of hooks, means for raising a selected group of said hooks to a predetermined elevation, a series of long bottom hooks, a series of relatively short bottom hooks paired with said long bottom hooks, a slidable taut connection joining the short bottom hooks of each pair to a harness cord, and a slidable slack connection joining the long bottom hook of each pair to said harness cord, whereby elevation of the short bottom hook provides relatively instant elevation of the harness cord and elevation of the long bottom hook provides delayed elevation of the same harness cord.

7. In a pile fabric loom jacquard, a plurality of pairs of hooks, means for raising a selected group of said hooks to a predetermined elevation said hooks being of substantially equal bottom lengths and arranged in pairs, a taut connection between one hook of a pair to a heddle, and a relatively longer slack connection from the other hook of said pair to the same heddle when all of said hooks are in a lowered position.

8. A jacquard for pile fabric looms comprising a frame, a griff vertically reciprocable in said frame, a plurality of knives carried by said griff, means for reciprocating the griff and knives, a stationary grate in said frame, a plurality of hooks supported on said grate and positioned to be selectively engaged by the knives, a taut connection from one hook to a heddle in the loom, and a slack connection from another hook to the same heddle when all said hooks are resting on the grate.

References Cited in the file of this patent

Cam, Fancy and Automatic Looms, etc. International Library of Technology, Scranton, Pa., 1906: Jacquards, section 63, pp. 26–35.

Geschichte der Jacquard-Maschine. Friederich Kohl, Berlin, 1872. (Copy in Div. 21.) (Taf. VII, Fig. 30; and pp. 69–70 of text required.)